(12) United States Patent
Shemer et al.

(10) Patent No.: US 11,099,770 B1
(45) Date of Patent: Aug. 24, 2021

(54) VM PROTECTION WITH TRUE ZERO RTO

(71) Applicant: EMC IP Holding Company LLC, Hopkinton, MA (US)

(72) Inventors: Jehuda Shemer, Kfar Saba (IL); Jawad Said, Kfar Yasif (IL); Kfir Wolfson, Beer Sheva (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 17 days.

(21) Appl. No.: 16/802,120

(22) Filed: Feb. 26, 2020

(51) Int. Cl.
G06F 9/455 (2018.01)
G06F 3/06 (2006.01)

(52) U.S. Cl.
CPC .............. *G06F 3/065* (2013.01); *G06F 3/064* (2013.01); *G06F 3/0619* (2013.01); *G06F 3/0664* (2013.01); *G06F 3/0673* (2013.01); *G06F 9/45558* (2013.01); *G06F 2009/45562* (2013.01); *G06F 2009/45575* (2013.01); *G06F 2009/45583* (2013.01)

(58) Field of Classification Search
CPC ................... G06F 9/45558; G06F 2009/45562
See application file for complete search history.

(56) References Cited

U.S. PATENT DOCUMENTS

| | | | |
|---|---|---|---|
| 2012/0072659 A1* | 3/2012 | Wade ................... | G06F 11/1453 711/112 |
| 2018/0349233 A1* | 12/2018 | Zaydman ............. | G06F 11/2097 |
| 2019/0349428 A1* | 11/2019 | Kovacheva ......... | H04L 67/1095 |
| 2020/0201616 A1* | 6/2020 | Mueller .................... | G06F 8/65 |

* cited by examiner

*Primary Examiner* — Edward J Dudek, Jr.
(74) *Attorney, Agent, or Firm* — Workman Nydegger (57) ABSTRACT

One example method includes powering off a replica VM, taking a snapshot of an OS disk of a source VM associated with the replica VM, taking a snapshot of an OS disk of the replica VM, generating a list of blocks that includes all blocks of the source VM OS disk that have changed since a preceding cloning or snapshot process and further includes all blocks of the replica VM OS disk that have changed since the preceding cloning or snapshot process, and performing an override of the replica VM disk by writing, to the replica VM OS disk, the respective source VM OS disk values for each block in the list of blocks.

20 Claims, 5 Drawing Sheets

VM PROTECTION WITH TRUE ZERO RTO

FIELD OF THE INVENTION

Embodiments of the present invention generally relate to data backup and restore processes. More particularly, at least some embodiments of the invention relate to systems, hardware, software, computer-readable media, and methods for reducing the Recovery Time Objective (RTO) of a restore process.

BACKGROUND

In some backup systems involving virtual machines (VM), IO operations of a production VM may be replicated to a replica VM that may also include applications and an operating system (OS). The replica VM may be in a powered off, or 'shadow,' mode in which the OS of the replica VM is not running. While the use of a replica VM is useful in that protection may be afforded to the production VM, the RTO of the replica VM may be unacceptably long. For example, the RTO for the replica VM may include VM OS boot time, which could be several minutes, and application start time, which may be 10s of seconds. However, there may be a need to update the OS from time to time.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data backup and restore processes. More particularly, at least some embodiments of the invention relate to systems, hardware, software, computer-readable media, and methods for reducing the Recovery Time Objective (RTO) of a restore process.

In general, example embodiments of the invention may be implemented in connection with a source VM and a replica VM that can be used for restoration of the source VM. Such embodiments are generally concerned with reducing the RTO of the restore process while also providing updates to an OS disk of a replica system or device such as a VM. Various approaches, including a standard update approach and override update approach, are disclosed for ensuring that the OS and/or applications of a replica VM are kept up to date, that is, for synchronizing the replica VM with the source VM. It is noted here that while it is possible, and desirable, in some circumstances to reduce RTO by eliminating updates to the replica OS disk, such an approach may not be well suited for other circumstances.

For example, over a period of time, and possibly the lifetime of the source VM, the OS and applications of the source VM may receive updates and security fixes which it may be useful to apply to the replica VM as well. The nature of such updates, if not replicated or otherwise installed at the replica VM, is such that they may result in variances between the production and replica OS disks. Even minor variances between the production and replica OS disks may have a variety of undesirable consequences. For example, updates to the replica OS disk may fail, OS versions may be different, and anti-virus applications may, or may not, discover different threats. More significant variances between the production and replica OS disks may be particularly problematic, such as when an application fails to run properly on the replica VM. Because the replica VM may be relied upon in a disaster recovery (DR) scenario, the failure of the replica VM applications to run due to OS problems can impair the operations of the entity, and the ability of the entity to recover from the disaster.

In one example embodiment, snapshots may be taken of an OS disk of a source VM and an OS disk of a replica VM. The snapshots may be compared with, respectively, previous snapshots of the OS disk of the source VM and OS disk of the replica VM to generate a list of all blocks that have changed since the previous snapshots were taken. The values for those blocks are then read out from the OS disk of the source VM and replicated to the corresponding blocks of the OS disk of the replica VM, thereby synchronizing the replica VM OS disk with the source VM OS disk. The synchronization process may be initiated based on one or more criteria relating to the updates to be performed.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that data of an OS disk of a source VM may be protected while maintaining an acceptable RTO for the source VM. An embodiment may enable an OS disk of a replica VM to be synchronized with an OS disk of a source VM while reducing or minimizing the impact on RTO. An embodiment of the invention may employ source VM and replica VM snapshots to minimize the amount of data that must be written during a synchronization process.

An embodiment of the invention may employ source VM and replica VM snapshots to identify only the blocks of the source VM and replica VM that have changed since prior snapshots were taken.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/ or cause the implementation of, data protection operations. Such data protection operations may include, but are not limited to, data read/write/delete operations, data deduplication operations, data backup operations, data restore operations, data cloning operations, recovery operations, data archiving operations, and disaster recovery operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing and other services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Figure 1:
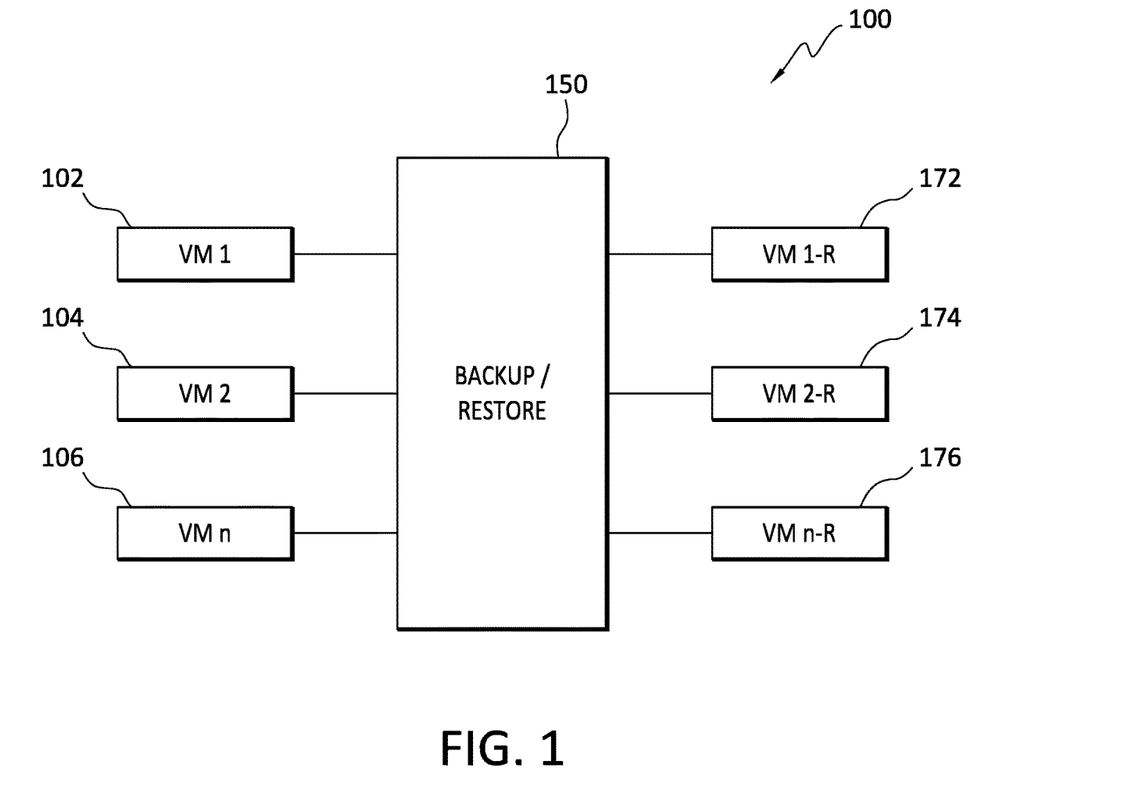
FIG. 1 discloses aspects of an example operating environment.

With particular attention now to FIG. 1, one example of an operating environment for embodiments of the invention is denoted generally at 100. In general, the operating environment 100 may include any number 'n' of production VMs such as VM1 102, VM2 104, and VMn 106. One or more of the production VMs may run onsite at the premises of an enterprise, or may run in a cloud operating environment. As used herein, 'production VM' embraces any VM that is operable to perform one or more functions, such as functions pertaining to the operation of an enterprise, for example. Thus, production VMs may comprise one or more applications that generate new and/or modified data, some or all of which may be protected. Replication is not limited to VM data. The VMs themselves may be protected as well, such as by replication in the form of respective replica VMs. Thus, in the event that a problem were to arise causing the failure of a production VM, the failed production VM can be restored using the corresponding replica VM, or the system may simply failover from the failed VM to the replica VM, which may then function as a production VM.

To facilitate replication of a production VM, the operating environment 100 may include a backup/restore server 150, or other entity, that may cooperate with the production VMs VM1 102, VM2 104, and VMn 106, to create respective replica VMs, namely, VM1-r 172, VM2-r 174, and VMn-r 176. The replica VMs may reside at a cloud storage site and/or any other site, including on-premises at an enterprise for example. The backup/restore server 150 may likewise reside at a cloud storage site, although that is not required.

For example, in some embodiments, the backup/restore server 150 may be a standalone system running at a site separate from an enterprise site and a storage site.

Note that the backup/restore server 150 is one example of a replication system. Other entities, or combinations thereof, operable to implement the functionalities disclosed herein, such as the functionalities of the backup/restore server 150 for example, constitute other example implementations of a replication system.

In some embodiments at least, IO operations from the production VMs are replicated, by the backup/restore server 150 for example, to the respective replica VMs in real time as the IOs are written to the production VM disks. To illustrate, a VM any-PIT data protection system such as, for example, RecoverPoint for VMs (RP4VMs), may replicate all IO operations from a production VM to a replica VM. The replica VM disks may be constantly updated with new data written to the production VM disks, and the access to the replica VM disks may be blocked by a software component, such as a splitter in the case of RP4 VMs, in order to avoid inconsistencies and data changing 'under the feet of' the OS.

B. RTO—Overview

Data protection is important for organizations. For example, protecting VMs is a key element for organizations using virtualization in their data centers. Generally, organizations would prefer that their Recovery Time Objective (RTO) be as short as possible, that is, is the maximum acceptable amount of time for restoring an application and regaining access to data after an unplanned disruption. Depending upon the circumstances and system configuration, an RTO may involve various processes, which may, or may not, be performed in a particular sequence, as illustrated in the following example:
1. Disk rolling time
   a. Restore the replica disk to the chosen PIT.
   b. It would typically take a short time (a few seconds) in case the user chose latest image.
2. Hardware configuration
   a. Before powering up the replica VM, the replication system brings the hardware to the required configuration according to the production VM
   b. Examples: CPU, Memory, Network, etc.
   c. It may take 10s of seconds, depending on virtualization infrastructure response time.
3. POST (Power-On Self-Test)
   a. POST is the diagnostic testing sequence that a computer runs to determine if the computer hardware is working correctly.
4. OS boot time
   a. OS usually takes several minutes depending on OS type, drivers, and hardware.
5. Network discovery and connection
   a. Network discovery and connection may take several seconds.
6. Login
   a. User login for AD for example, takes several seconds.
7. App start time
   a. App may take 10s of seconds.

The time required to power up the replica VM and perform the example sequence, that is, the RTO for that replica VM, may be measured in minutes. This may be an unacceptably long time in some circumstances. Accordingly, and with reference now to FIG. 2, the following discussion addresses some example approaches to replicate an entity, such as a VM, so as to reduce the RTO. In general, the example approach disclosed in FIG. 2 involves replicating only non-OS disks of a protected VM, although it should be understood that this approach may be applied, more generally, to other protected entities, and the scope of the invention is not limited to employment of the disclosed methods in connection with VMs. In the example configuration 200 of FIG. 2, the VMDKs are disks that may be employed in VMware implementations.

Figure 2:
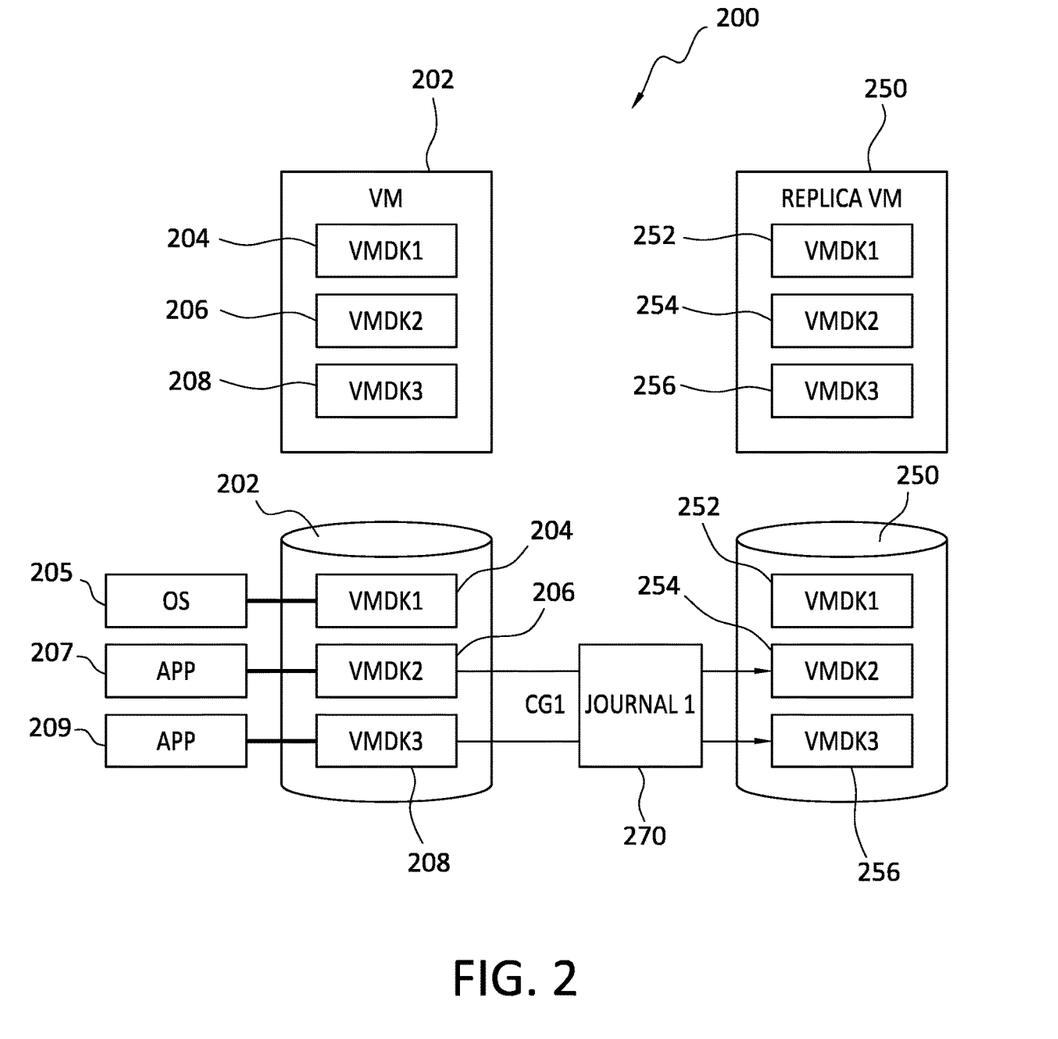
FIG. 2 discloses aspects of an example VM replication configuration.

In general, at least some embodiments of the invention involve the use of a replicated VM that has more than one hard disk. Thus, in the example of FIG. 2, the configuration 200 comprises a VM 202, such as a source or production VM for example, that includes one or more disks, for example, OS disk VMDK1 204, data disk VMDK2 206, and data disk VMDK3 208. In the example of FIG. 2, VMDK1 204 is the OS disk and as such, contains the OS 205 for the VM 202, and VMDK2 206 and VMDK3 208 are data disks that may respectively contain, for example, application data 207 and 209 associated with one or more applications of the VM 202. The executable applications themselves may reside on either VMDK1 204, that is, the OS disk, or on one or more of VMDK2 206 and VMDK3 208, that is, the data disks. One or both of the data disks VMDK2 206 and VMDK3 208 may comprise, for example, a respective file system, or the one or both of the VMDK2 206 and VMDK3 208 data disks may be raw block devices, depending upon the requirements of the VM 202 applications.

With continued reference to FIG. 2, a replica VM 250 is provided that includes a set of disks, where the disks respectively correspond to OS disk VMDK1 204, data disk VMDK2 206, and data disk VMDK3 208 of the source or production VM 202. Particularly, the replica VM 250 includes an OS disk VMDK1 252, data disk VMDK2 254, and data disk VMDK3 256. In general, IOs involving application data 207 and/or 209 of the source VM 202 may be replicated to, respectively, data disk VMDK2 254, and data disk VMDK3 256, of replica VM 250. These IO replication transactions may be captured in a replication journal 270, although that is not required. The replication journal 270 may include a history of IOs written to the data disks of the replica VM 250, and when those IOs were written.

It is noted that while the example of FIG. 2 includes source and replica VMs 202 and 250, respectively, that comprise multiple disks, VMs with only a single disk may be re-configured for employment in connection with embodiments of the invention. For example, a single disk VM may be modified by adding a second disk to the single disk VM, formatting the added disk with a file system, and setting the application data source to reside on the second disk. If needed, a replica VM of the source VM that initially had the single disk configuration may be similarly modified in the event that the replica VM was initially configured with only a single disk.

With continued reference to the example of FIG. 2, a single OS disk 204, 252, respectively, is provided for the source VM 202 and the replica VM 250. In general, the OS and the applications may collectively reside on a predefined fixed number of disks. The disk holding the OS may be defined or tagged as such by the user. Alternatively, the user may define or tag the application disks as such. In some embodiments, a source VM and/or replica VM may each have multiple OS disks.

Figure 3:
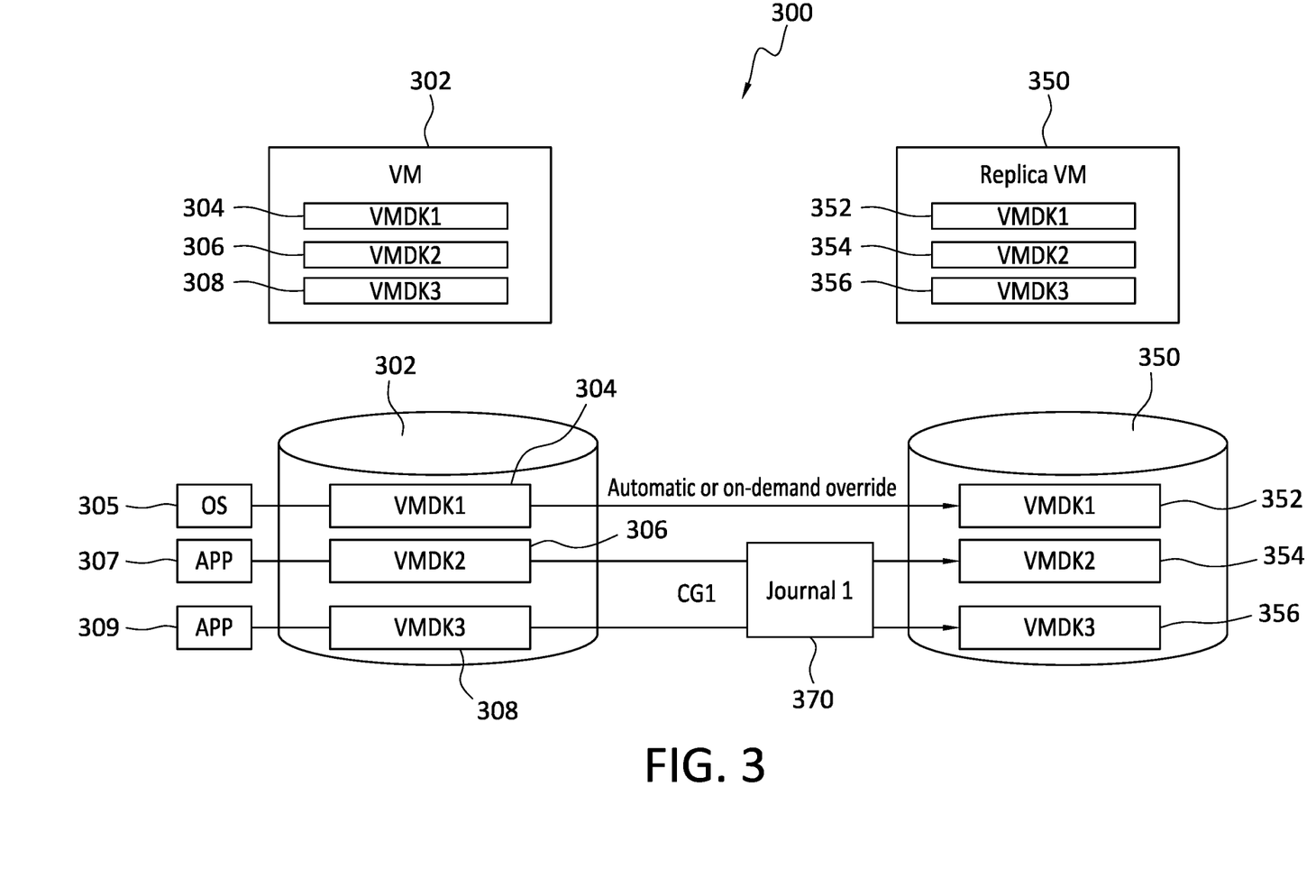
FIG. 3 discloses aspects of an override process.

Turning next to FIG. 3, aspects of some approaches for reducing RTO, while also updating applications and/or OS of a replica VM, are disclosed. In the example configuration 300 of FIG. 3, a source VM 302 may include an OS disk VMDK1 304, and data disks VMDK2 306 and VMDK3 308. Thus, VMDK1 304 may contain an OS 305 of the source VM 302, and VMDK2 306 and VMDK3 308 may respectively contain, for example, application data 307 and 309 associated with one or more applications of the VM 302. The executable applications themselves may reside on either VMDK1 304, that is, the OS disk, or on one or more of VMDK2 306 and VMDK3 308, that is, the data disks. One or both of the data disks VMDK2 306 and VMDK3 308 may comprise, for example, a respective file system, or the one or both of the VMDK2 306 and VMDK3 308 data disks may be raw block devices, depending upon the requirements of the VM 302 applications.

With continued reference to FIG. 3, a replica VM 350 is provided that includes a set of disks, where the disks respectively correspond to OS disk VMDK1 304, data disk VMDK2 306, and data disk VMDK3 308 of the source or production VM 302. Particularly, the replica VM 350 includes an OS disk VMDK1 352, data disk VMDK2 354, and data disk VMDK3 356. In general, IOs involving application data 307 and/or 309 of the source VM 302 may be replicated to, respectively, data disk VMDK2 354, and data disk VMDK3 356, of replica VM 350. These IO replication transactions may be captured in a replication journal 370, although that is not required. The replication journal 370 may include a history of IOs written to the data disks of the replica VM 350, and when those IOs were written.

It is noted that while the example of FIG. 3 includes source and replica VMs 302 and 350, respectively, that comprise multiple disks, VMs with only a single disk may be re-configured for employment in connection with embodiments of the invention. For example, a single disk VM may be modified by adding a second disk to the single disk VM, formatting the added disk with a file system, and setting the application data source to reside on the second disk. If needed, a replica VM of the source VM that initially had the single disk configuration may be similarly modified in the event that the replica VM was initially configured with only a single disk.

C. OS Synchronization Processes

With reference to the example of FIG. 3, embodiments of the invention may enable the OS and/or applications of the replica VM 350 to be kept up to date with the OS and/or applications of the source VM 302. The updating of the replica VM 352 may be implemented using various processes including, for example, an automatic update process, and/or, and on-demand override update process, which may be referred to herein simply as an 'override update' process.

In an automatic update process, OS and/or application updates may be installed directly on the running replica VM 350, rather than being first installed on the source VM 302, and then replicated from the source VM 302 to the replica VM 350. Thus, in the automatic update process, the replica VM 350 may be updated in the same, or a similar, way to the way in which the source VM 302 is updated. In some embodiments, the OS and/or applications of the replica VM 350 may be updated a certain amount of time after the corresponding source VM 302 has been updated. This amount of time, which may be about 2 hours in some example embodiments, may provide adequate time to ensure that the updated source VM 302 is running properly before the same updates are made to the replica VM 350.

With regard to the override update process, embodiments of such a process may involve overriding the OS disk VMDK1 352 of the replica VM 350 with the data from the OS disk VMDK1 304 of the production VM 302. That is, data, including the OS, from the OS disk VMDK1 304 of the production VM 302 may be replicated to the OS disk VMDK1 352 of the replica VM 350. Because the replica VM 350 may be up and running, overriding the OS disk VMDK1 352 of the replica VM 350 will require powering off the replica VM 350, during which time the RTO will increase until the replica VM 350 is booted and the applications and/or OS is reloaded on the replica VM 350.

Thus, the override update process may provide a full synchronization point between the source VM 302 and the replica VM 350, but at the expense of downtime of the replica VM 350. Accordingly, the need to update the replica VM 350 may have to be balanced against the resultant impact on RTO while the updating is performed. As such, an aim of some embodiments is to balance these considerations by using the override update process, but keeping such use to the minimum necessary to meet update and RTO requirements.

Example methods and processes for keeping an OS disk of a replica VM up to date may comprise at least two components. The first component includes criteria that may be used to determine when an override update process should be used. The second component is minimizing, to the extent practical, the downtime incurred as a consequence of use of the override update process.

With reference first to the first component, a variety of criteria or approaches may be used to determine or define when an override update process should be used. These criteria may each be employed alone, or in any combination, in various embodiments. In some embodiments, for example, an override update process may be performed on a periodic basis. For example, the OS disk of a replica VM may be overridden, that is, updated with data from the OS disk of the source VM, once a week or on some other periodic basis.

Cumulative updates are another example of a criterion which may be used to determine when an override update process should be performed. As used herein, a 'cumulative update' embraces any update in which, for example, the aggregate size of the updates to the OS disk and/or to one or more application disks is larger than X % of the disk(s). For example, a cumulative update criterion may specify that when the aggregate size of needed updates to an OS disk of a replica VM reaches 10% of the total OS disk space, relative to the last time that the OS disk was updated, the updates should be implemented to the OS disk Still another example of a criterion which may be used to determine when an override update process should be performed concerns whether or not the update(s), or some portion of an update, requires a reboot of the replica VM. For example, a kernel update to the replica VM may require an OS reboot. Because an OS reboot may be time consuming, performing a disk override may be preferable to installing the update, such as kernel update, directly at the replica VM.

In some cases, it may be useful to use a process other than an override update process to make changes to a replica VM. For example, where critical updates are needed to the OS disk(s) and/or application disk(s) of the replica VM, a decision may be made not to override the replica OS disk by replicating an update from the source VM, but to instead install the update directly on the replica VM. This keeps the replica VM up to security and other standards. A critical update may be any update that the OS and/or applications urgently need, such that the functionality of the replica VM may be impaired or disrupted without installation of the update. Another example of a critical update may be a security update that needs to be installed immediately to reduce risk. In situations where a critical update is needed to a replica VM, such updates may be applied a short period of time, such as about 1 hour for example, after the update has been verified to be functioning properly on the production, or source, VM.

As discussed, one component of some example methods and processes for keeping an OS disk of a replica VM is determining when to use, or not use, an override update process to replicate OS and/or application data from a source VM to a replica VM. A second, related, component is implementing the override update process in such a way as to minimize replica VM downtime. This component may be implemented in a variety of ways, the simplest of which may be to simply clone the full OS disk of the source VM every time there is a need to override the replica OS disk. While simple, such an approach would likely require significant bandwidth and time to perform and, as such, may not be suitable in some circumstances.

Another approach implementing the override update process in such a way as to minimize replica VM downtime may involve the use of snapshots of one or more source VM disks and snapshots of corresponding disks of the replica VM, so as to synchronize only the differences, which may be referred to herein using the notation 'Diff,' between the disks. Snapshots need not be of any particular type but may, for example, be hypervisor-based, such as VMware snapshots with CBT, or may be Storage array based, such as XtremIO/VMAX snapshots. As another example, hypervisor direct snapshots, such as DellEMC RecoverPoint for VM snapshots, may be used. Following is a discussion of an example implementation of an update override process using storage-based snapshots, although any of the other disclosed snapshot types may be used in other embodiments.

In some embodiments, an initial cloning process may be performed. The production, or source, VM may be running during part or all of the initial cloning process, although in other embodiments, the source VM may not be running during some or all of the initial cloning process. In general, the initial cloning process involves cloning part or all of the source VM to the replica VM. The cloned portion of the source VM may comprise one or more application disks and/or one or more OS disks.

An embodiment of the initial cloning process, which may be implemented using a source VM and a replica VM, may comprise the following operations:

a. Clone production (source) OS disk (disk A) to a replica OS disk (disk B);

b. Take a snapshot of the disk A (can reside on a VVOL or dedicated datastore) this snapshot may be designated 'snap #A1';

c. Take a snapshot of the disk B this snapshot may be designated 'snap #B1' (may be identical to snap #A1 but resides on the replica site storage); and d. Connect disk B to the replica VM and power up the replica VM.

After an initial cloning process is performed, subsequent updates to a source VM OS disk and replica VM OS disk may be implemented by way of the following example process. Particularly, the following operations may be performed for the next update:

a. Power off replica VM to avoid any more changes to disk B;

b. Take a snapshot of disk B this snapshot may be designated 'snap #B2';

c. Take a snapshot of disk A this snapshot may be designated 'snap #A2';

d. Using storage Diff (Application Program Interface(s)) APIs, retrieve only the list of changed blocks, namely: (i) diffA=changed blocks between snap #A1 and snap #A2, (ii) diffB=changed blocks between snap #B1 and snap #B2;

e. allDiffs=diffA∪diffB (union of the two sets);

f. Read all the blocks in allDiffs from snap #A2 (may require mounting snap #A2);

g. Send the blocks to the replica site and write them to disk B (may require mounting of disk B)—after this stage, disk B should be identical to snap #A2 since all the differences between the disks from the data in snap #A2 have been overridden;

h. Delete snapshot #B2, and take a new snapshot of disk B, call it #B2.1;

i. Power up the replica VM; and j. Delete the older snapshots: snap #A1 and snap #B1. In some embodiments, one, some, or all, of the older snapshots may be retained. The retained snapshots may be used, for example, to roll the source VM OS disk and/or the replica VM OS disk back to a particular point in time (PiT). The older snapshots, if retained, may be stored at any suitable location(s).

Subsequent updates may be performed in the same general manner. For example, the next iteration of the process noted above may be performed with snaps #A3 and #B3. For example, the next update may involve taking snaps #A3, #B3 (see b. and c. above), and comparing them (in d. above) to snap #A2 and snap #B2.1, respectively.

In some embodiments, the changed blocks may be written to replica disk B as soon as they arrive at the replica site where the replica VM is located. The foregoing example assumes a single OS disk/application disk at the source VM and replica VM. However, the scope of the invention is not limited to that example. Rather, the same algorithm may be applied for multiple devices, such as multiple OS disks and/or multiple application disks, of a source VM and a replica VM. In this case, consistency may be maintained by taking a snapshot of, for example, all the source VM devices at the same time, rather than taking separate individual snapshots of each of the source VM devices. The same approach may be applied as well to the replica VM devices.

With the foregoing points in view, attention is directed now to a simple example that serves to illustrate aspects of various embodiments of the invention. With respect to the example, and other disclosed embodiments, it is noted that with respect to a disk B of a replica VM, changes to that disk B may be written from various sources. For example, and as noted herein, IOs written to a disk A of a source VM may be replicated to disk B. As another example, IOs may be written to disk B in connection with processes performed by the replica VM such as, but not limited to, replica VM OS processes for checking network availability, implementing OS updates or, more generally, any process other than replication of a source VM IO to the replica VM. The foregoing points apply as well to changes to the disk A. For example, changes to the disk A may be written from various sources including from processes internal to the source VM such as checking network availability, and/or from sources external to the source VM.

In the following illustrative example, which involves respective source VM and replica VM OS disks but may additionally or alternatively involve application disks, suppose that a production VM has a block, denoted as block #1 for example, on the disk A and block #1 has a value XXXX00000XXXXX. After initial cloning, and/or after a synchronization process between the production VM and a corresponding replica VM has been completed, the disk B of the replica VM has block #1 with the same value as on disk A, namely, XXXX00000XXXXX.

With both the source VM and the replica VM running, it is further assumed, for the purposes of the present example, that the OS of the source VM and the OS of the replica VM each have a process to check network availability/OS updates/or other. The process may be the same at each of the OS disks. In the production VM, the OS process has completed successfully and correspondingly updated block #2 at the production VM with some value. In this example, a block #1 at the source VM remains unchanged by the OS process and has the value XXXX00000XXXXX. On the other hand, however, the corresponding OS process in the replica VM has failed for some reason, and that OS process has correspondingly updated block #1 at the replica VM from its pre-process value of XXXX00000XXXXX to the new value XXXX00001XXXXX. In this example then, diffA is block #2, and diffB is block #1, such that diffA U diffB=block #2 and block #1. The values of block #1 and block #2 may be read out from disk A and then sent to disk B for writing. As discussed below, if either or both of the disk A values of block #1 and block #2 are different from the respective disk B values for those blocks, then the disk B values for those blocks will be overwritten with the disk A values for those blocks.

The success and failure of the source VM process and the replica VM process, respectively, may have various implications with respect to the operations that may need to be performed to synchronize the source VM OS disk and the replica VM OS disk with each other. Particularly, when the time arrives for the next update, that is, the next synchronization of the source VM OS disk and the replica VM OS disk with each other, at least two updates would need to be implemented, in this example, to achieve synchronization of the two OS disks: (i) update block #2 of disk B to reflect the change that was made to block #2 of disk A as a result of successful completion of the OS process at the source VM; and (ii) update block #1 in disk B with the value XXXX00000XXXXX, thus overwriting the value XXXX00001XXXXX that resulted from the failed OS process at the replica VM this update will bring block #1 of disk B back into synchronization with block #1 of disk A so that both have the same value XXXX00000XXXXX. As to the block #1 update, since that update did not appear in diffA, it is known that block #1 of disk B is out of synch with block #1 of disk A and, as such, block #1 of disk B must be reverted to the value it had when snap #B1 was taken.

As apparent from the foregoing example, and the rest of this disclosure, embodiments of the invention may be useful in helping to maintain an OS disk of a replica VM up to date with an OS disk of an associated production VM. This may be attained through application of various criteria to determine when an override process may be performed. As well, embodiments of the invention may employ processes for how to handle critical updates that might cause problems or security risks. Finally, embodiments may employ snapshot technology to minimize the downtime when overriding the replica VM, keeping RTO to a minimum as much as possible.

D. Example Methods

Figure 4:
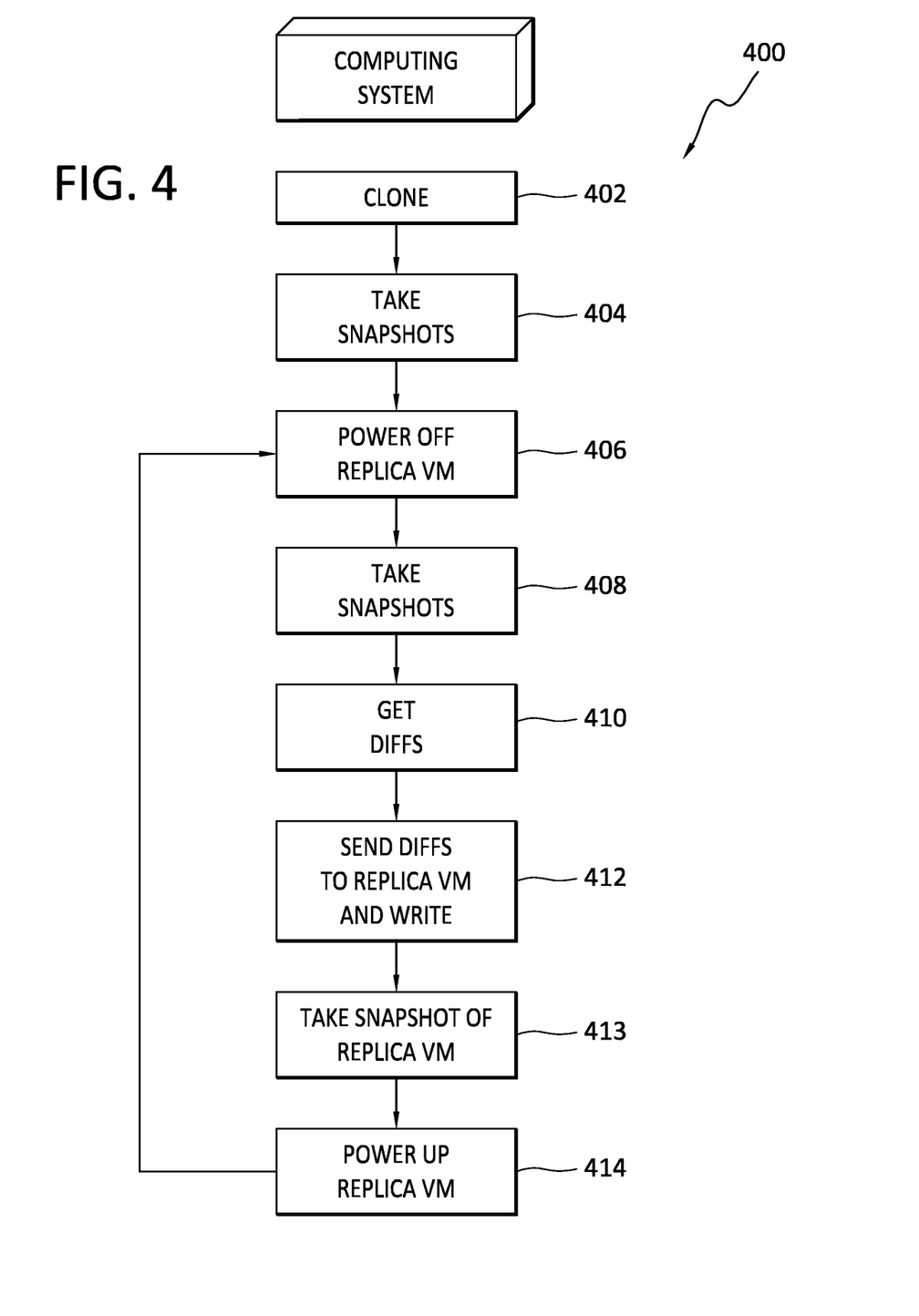
FIG. 4 discloses aspects of an example process for updating an OS disk.

With reference now to FIG. 4, details are provided concerning some methods for synchronizing source and replica disks, such as OS disks, while maintaining an acceptable RTO. One example of such a method is denoted generally at 400 in FIG. 4. In some embodiments, part, or all, of the method 400 may be performed by and/or at the direction of, a single entity, such as a backup and restore server for example. However, the method 400 is not required to be performed by any particular entity, or group of entities. In other embodiments, the method 400 may be performed, in whole or in part, in a cloud computing environment, examples of which are disclosed herein.

The method 400 may begin when an initial cloning process 402 is performed. The initial cloning process 402 may involve, for example, cloning an OS disk of a source VM to a replica VM so that the OS disks of the source and replica VMs are the same. One or both of the source VM and replica VM may be powered on, or off, during the initial cloning process 402. After the initial cloning process 402, respective snapshots may be taken 404 of the source VM OS disk and the replica VM OS disk. In at least some embodiments, the two snapshots are the same. The snapshots may be stored, respectively, at a storage site with which the source VM is associated and at a storage site with which the replica VM is associated.

At some point after the initial cloning process 402, an update process may be initiated that comprises synchronization of the source VM OS disk and the replica VM OS disk. This synchronization may involve overriding some, or all, of the data on the replica VM OS disk with data on the source VM OS disk. The timing of the update process may be determined based on one or more criteria, examples of which are disclosed herein. The update process may comprise the processes 406 through 412 discussed below, and need not be performed immediately after, or any particular amount of time after, the initial cloning process 402.

The update process may begin with powering off the replica VM 406 for a period of time so that no further IOs are written to the replica VM OS disk. The source VM may, or may not, continue to run after the replica VM is powered off 406. After the replica VM is powered off 406, respective snapshots of the source VM and replica VM may be taken 408. These snapshots may reflect changes that have occurred to the data at the source VM OS disk and the replica VM OS disk, respectively, since the preceding update if any, or since the initial cloning process 402 was performed.

Since the snapshots 408 may each identify only the changes that have occurred at their respective disk since the previous update, or since the initial cloning process 402, a set may be defined 410 that comprises, or consists of, all the changed blocks of the source VM OS disk (diffA)+all the changed blocks of the replica VM OS disk (diffB). DiffA may, or may not, overlap with diffB. That is, for example, a block #2 of both the source VM OS disk and the block #2 of the replica VM OS disk may have changed. Additionally, or alternatively, one or more particular blocks may appear in the diffA list but not in the diffB list, and/or one or more particular blocks may appear in the diffB list but not in the diffA list. In any case, the aforementioned set identifies all blocks regardless of their respective values, and whether the blocks are from the source VM OS disk or the replica VM OS disk, that have changed.

Once a complete list of changed blocks has been obtained 410, the respective source VM OS disk values of each of those blocks may then be replicated to the corresponding blocks of the replica VM OS disk. That is, the block values from the source VM OS disk may then be sent to the replica site and written to the corresponding blocks of the replica VM OS disk 412. In this way, the replica VM OS disk is brought into synchronization with the source VM OS disk. After the replica VM OS disk has been synchronized, a snapshot may be taken 413 of the synchronized replica VM OS disk.

Finally, the replica VM may be powered on 414 after synchronization has been completed. If not already powered on, the source VM may be powered on as well. The replica VM and the source VM may now start, or continue, to process IOs at their respective application disk(s). As shown in FIG. 4, the process 400 may return any number of times to stage 406, periodically or on any other basis disclosed herein, for instantiation of another synchronization process.

E. Further Example Embodiments

Following are some further example embodiments of the invention. These are presented only by way of example and are not intended to limit the scope of the invention in any way.

Embodiment 1. A method, comprising: powering off a replica VM; taking a snapshot of an OS disk of a source VM associated with the replica VM; taking a snapshot of an OS disk of the replica VM; generating a list of blocks that comprises all blocks of the source VM OS disk that have changed since a preceding cloning or snapshot process and further comprises all blocks of the replica VM OS disk that have changed since the preceding cloning or snapshot process; and performing an override of the replica VM disk by writing, to the replica VM OS disk, the respective source VM OS disk values for each block in the list of blocks.

Embodiment 2. The method as recited in embodiment 1, further comprising performing the following operations prior to powering off the replica VM: performing an initial cloning process in which data from the source VM OS disk is cloned to the replica VM OS disk; and taking a snapshot of the source VM OS disk, and taking a snapshot of the replica VM OS disk.

Embodiment 3. The method as recited in any of embodiments 1-2, further comprising taking a snapshot of the replica VM OS disk after the override has been performed.

Embodiment 4. The method as recited in any of embodiments 1-3, wherein the operations are begun only after one or more criteria are met, and the criteria comprise: a periodic update basis; a cumulative update basis; an OS disk reboot requirement; and a critical update basis.

Embodiment 5. The method as recited in any of embodiments 1-4, wherein one or more blocks in the list of blocks are blocks of the replica VM OS disk that have been changed as a result of a process performed by the replica VM OS.

Embodiment 6. The method as recited in any of embodiments 1-5, further comprising deleting, after the override is successfully completed, the snapshots of the OS disk of the replica VM and the OS disk of the source VM.

Embodiment 7. The method as recited in any of embodiments 1-6, further comprising, after the override is successfully completed, connecting the replica VM OS disk to the replica VM, and powering up the replica VM.

Embodiment 8. The method as recited in any of embodiments 1-7, wherein all changes written to the replica VM OS disk in the override process are written from the source VM OS disk.

Embodiment 9. The method as recited in any of embodiments 1-8, wherein only values of source VM OS disk blocks that differ from respective values of corresponding replica VM OS disk blocks are written to the replica VM OS disk.

Embodiment 10. The method as recited in any of embodiments 1-9, wherein generating the list of blocks comprises: comparing the snapshot of the source VM OS disk with a snapshot of the source VM OS disk that was generated in a preceding cloning or snapshot process; and comparing the snapshot of the replica VM OS disk with a snapshot of the replica VM OS disk that was generated in a preceding cloning or snapshot process.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
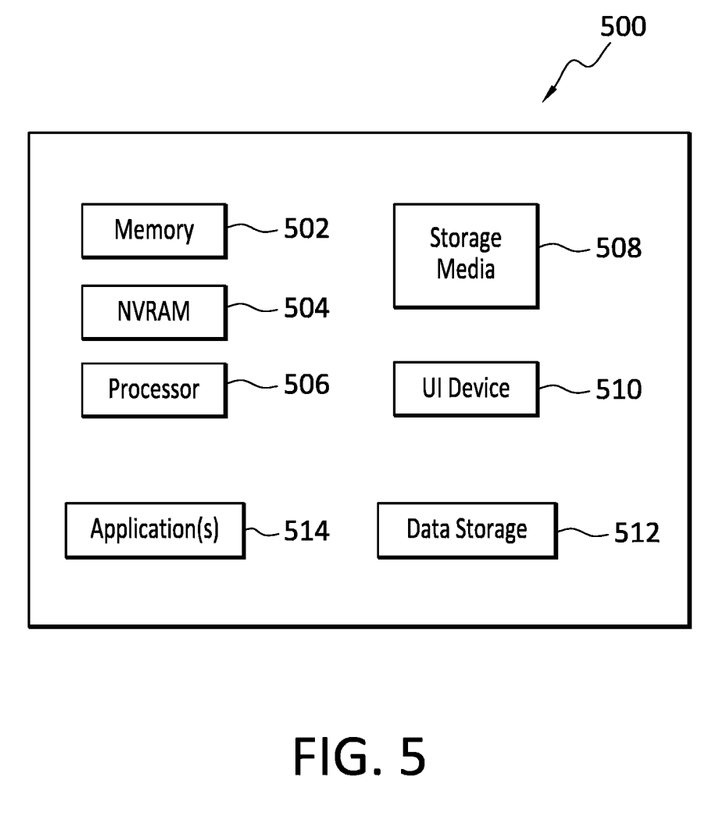
FIG. 5 discloses aspects of an example computing entity.

With reference briefly now to FIG. 5, any one or more of the entities disclosed, or implied, by FIGS. 1-4 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile random access memory (NVRAM) 504, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   powering off a replica VM;
   taking a snapshot of an OS disk of a source VM associated with the replica VM;
   taking a snapshot of an OS disk of the replica VM;
   generating a list of blocks that comprises all blocks of the source VM OS disk that have changed since a preceding cloning or snapshot process and further comprises all blocks of the replica VM OS disk that have changed since the preceding cloning or snapshot process; and
   performing an override of the replica VM disk by writing, to the replica VM OS disk, the respective source VM OS disk values for each block in the list of blocks.

2. The method as recited in claim 1, further comprising performing the following operations prior to powering off the replica VM:
   performing an initial cloning process in which data from the source VM OS disk is cloned to the replica VM OS disk; and
   taking a snapshot of the source VM OS disk, and taking a snapshot of the replica VM OS disk.

3. The method as recited in claim 1, further comprising taking a snapshot of the replica VM OS disk after the override has been performed.

4. The method as recited in claim 1, wherein the operations are begun only after one or more criteria are met, and the criteria comprise: a periodic update basis; a cumulative update basis; an OS disk reboot requirement; and a critical update basis.

5. The method as recited in claim 1, wherein one or more blocks in the list of blocks are blocks of the replica VM OS disk that have been changed as a result of a process performed by the replica VM OS.

6. The method as recited in claim 1, further comprising deleting, after the override is successfully completed, the snapshots of the OS disk of the replica VM and the OS disk of the source VM.

7. The method as recited in claim 1, further comprising, after the override is successfully completed, connecting the replica VM OS disk to the replica VM, and powering up the replica VM.

8. The method as recited in claim 1, wherein all changes written to the replica VM OS disk in the override process are written from the source VM OS disk.

9. The method as recited in claim 1, wherein only values of source VM OS disk blocks that differ from respective values of corresponding replica VM OS disk blocks are written to the replica VM OS disk.

10. The method as recited in claim 1, wherein generating the list of blocks comprises:
    comparing the snapshot of the source VM OS disk with a snapshot of the source VM OS disk that was generated in a preceding cloning or snapshot process; and
    comparing the snapshot of the replica VM OS disk with a snapshot of the replica VM OS disk that was generated in a preceding cloning or snapshot process.

11. A non-transitory storage medium having stored therein instructions that are executable by one or more hardware processors to perform operations comprising:
    powering off a replica VM;
    taking a snapshot of an OS disk of a source VM associated with the replica VM;
    taking a snapshot of an OS disk of the replica VM;
    generating a list of blocks that comprises all blocks of the source VM OS disk that have changed since a preceding cloning or snapshot process and further comprises all blocks of the replica VM OS disk that have changed since the preceding cloning or snapshot process; and
    performing an override of the replica VM disk by writing, to the replica VM OS disk, the respective source VM OS disk values for each block in the list of blocks.

12. The non-transitory storage medium as recited in claim 11, wherein the operations further comprise performing the following operations prior to powering off the replica VM:
- performing an initial cloning process in which data from the source VM OS disk is cloned to the replica VM OS disk; and
- taking a snapshot of the source VM OS disk, and taking a snapshot of the replica VM OS disk.

13. The non-transitory storage medium as recited in claim 11, wherein the operations further comprise taking a snapshot of the replica VM OS disk after the override has been performed.

14. The non-transitory storage medium as recited in claim 11, wherein the operations are begun only after one or more criteria are met, and the criteria comprise: a periodic update basis; a cumulative update basis; an OS disk reboot requirement; and a critical update basis.

15. The non-transitory storage medium as recited in claim 11, wherein one or more blocks in the list of blocks are blocks of the replica VM OS disk that have been changed as a result of a process performed by the replica VM OS.

16. The non-transitory storage medium as recited in claim 11, wherein the operations further comprise deleting, after the override is successfully completed, the snapshots of the OS disk of the replica VM and the OS disk of the source VM.

17. The non-transitory storage medium as recited in claim 11, wherein the operations further comprise, after the override is successfully completed, connecting the replica VM OS disk to the replica VM, and powering up the replica VM.

18. The non-transitory storage medium as recited in claim 11, wherein all changes written to the replica VM OS disk in the override process are written from the source VM OS disk.

19. The non-transitory storage medium as recited in claim 11, wherein only values of source VM OS disk blocks that differ from respective values of corresponding replica VM OS disk blocks are written to the replica VM OS disk.

20. The non-transitory storage medium as recited in claim 11, wherein generating the list of blocks comprises:
- comparing the snapshot of the source VM OS disk with a snapshot of the source VM OS disk that was generated in a preceding cloning or snapshot process; and
- comparing the snapshot of the replica VM OS disk with a snapshot of the replica VM OS disk that was generated in a preceding cloning or snapshot process.

* * * * *